United States Patent [19]

Theobald

[11] 3,808,533

[45] Apr. 30, 1974

[54] HIGH VOLUME, BINARY DATA TRANSMISSION SYSTEM

[75] Inventor: Donald J. Theobald, La Jolla, Calif.

[73] Assignee: The United States of America as represented by the Secretary of the Navy, Washington, D.C.

[22] Filed: Sept. 10, 1971

[21] Appl. No.: 179,386

[52] U.S. Cl. .................................. 325/30, 178/66 R

[51] Int. Cl. .................................................. H04l 27/10

[58] Field of Search ......... 325/30, 163, 320, 58, 59, 325/61, 145, 131; 178/69.5, 66, 66 A, 88, 68, 66 R; 179/15 BS, 15 FD, 15 BP; 328/37; 307/221 R

[56] References Cited

UNITED STATES PATENTS

| | | | |
|---|---|---|---|
| 3,665,103 | 5/1972 | Watkins | 325/30 |
| 3,417,332 | 12/1968 | Webb | 325/163 |
| 3,142,723 | 7/1964 | Fleming | 325/320 |
| 3,564,412 | 2/1971 | Whang | 325/30 |
| 3,454,718 | 7/1969 | Perreault | 178/66 R |
| 3,566,033 | 2/1971 | Young | 178/66 R |
| 3,461,239 | 8/1969 | Widl | 325/30 |
| 3,648,180 | 3/1972 | Woodcock | 328/37 |
| 3,508,136 | 4/1970 | Danielsen | 178/66 R |
| 3,458,835 | 7/1969 | Saeger | 178/66 R |
| 3,409,831 | 11/1968 | Walker | 178/66 R |

OTHER PUBLICATIONS

IBM Tech. Disclosure, "Deserializer," by C. Williams, Vol. 14 No. 2 July 1971.

*Primary Examiner*—Benedict V. Safourek
*Assistant Examiner*—Aristotelis M. Psitos
*Attorney, Agent, or Firm*—R. S. Sciascia; G. J. Rubens; J. W. McLaren

[57] ABSTRACT

First and second carrier frequencies are generated to designate two binary states for transmitting digital information. Carrier frequencies are subdivided to generate clock frequencies at a high data bit rate. The first and second carrier frequencies are transmitted at the instantaneous bit rates determined by the clock frequencies. A frequency responsive means at a receiver detects the two different carrier frequencies and retains the resultant data bits in a storage means. The carrier frequencies are divided to sub-harmonic clock frequencies which are employed to sequentially actuate the storage means for accepting the data bits. Because the clock frequencies are extracted from the carrier frequencies, the problem of synchronizing clock rates at both the transmitter and the receiver with the respective transmitted and received signals is obviated. The carrier frequencies may be divided down to provide multiplexed transmission of a plurality of channels of information, each operating in the described manner.

7 Claims, 9 Drawing Figures

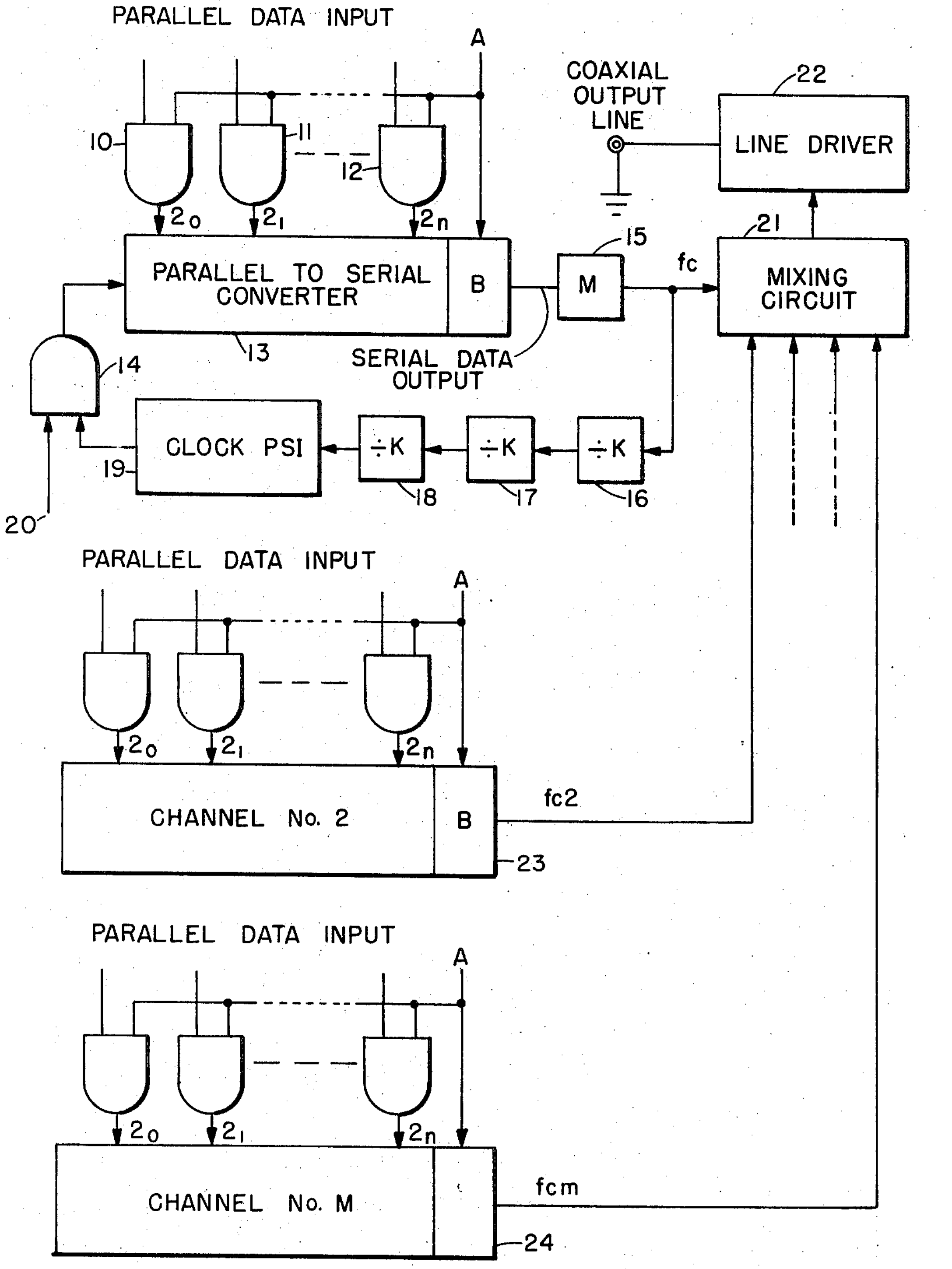
FIG. I
INVENTOR.
DONALD J THEOBALD
BY

INVENTOR.

BY DONALD J THEOBALD

INVENTOR.
DONALD J. THEOBALD
BY

INVENTOR.
DONALD J. THEOBALD
BY [signature]
[signature]

INVENTOR.
DONALD J. THEOBALD
BY [signature]
[signature]

HIGH VOLUME, BINARY DATA TRANSMISSION SYSTEM

CROSS REFERENCE TO RELATED APPLICATIONS

The subject matter of the instant invention is related to U.S. Pat. No. 3,721,913, issued Mar. 20, 1973, titled "DC to Sub-Microsecond Frequency Change Detector" and to pending U.S. Pat. application Ser. No. 178,984, filed Sept. 9, 1971, titled "DC to Sub-Microsecond Switchable Variable Frequency Oscillator."

BACKGROUND OF THE INVENTION

Parallel high data rate, large volume digital data systems have generally used space diversity i.e., a plurality of parallel input and output data lines to accommodate the transmission of large volumes of data. However, in that type of system, the requirement to transmit an increased volume of data, necessarily increases the required number of parallel input/output data lines by a commensurate amount. That type of inherent requirement to accommodate an increased volume of data obviously has its limitations; however, in addition the increased plurality of input/output data transmission lines also requires additional power and input/output circuits in proportion to the increased number of lines required to accommodate the additional high volume data.

In the prior art, the transmission of digital data on an amplitude modulated carrier was applicable to many systems which generally fell into one of two broad classifications. The first classification is that of low data rate and narrow bandwidths; the second classification is that of high data rates but which requires very high carrier frequencies, generally in the category of microwave systems.

Many telemeter data systems transmit digital data on lines in the form of pulses. These systems are in some cases multi-channel systems which time-share a line, i.e., employ time diversity only, and are generally of a relatively very low data rate capability.

If the data to be transmitted is required to be in parallel form at the output, it then becomes necessary to transmit clock signals on another line or alternatively to generate and synchronize clock signals with the data received at the terminal of the transmission line.

Moreover, in such prior art systems pulse distortion can become a major problem. The longer the lines or the higher the data rate required, the more distorted the pulse is likely to become. Therefore, a compromise is generally made to transmit at a lower data rate than might otherwise be desirable.

In a digital data system the 1's can be transmitted as a single sine wave and the 0's may also be transmitted as a single sine wave, but with a 180° phase difference. The upper frequency requirements are, however, twice that of a non-return-to-zero pulse data transmission system. Since in most data systems the data is not continuous, the separation of signal frequencies on a common line becomes very difficult. Consequently, time multiplexing of channels on a single line is not feasible in such a system and each additional channel requires another additional data line.

Accordingly, it is highly desirable that a data transmission system having high speed operation and high volume capability be devised without the requirement of a multiplicity of parallel-connected data lines and without the need to transmit clock pulses for synchronization purposes.

SUMMARY OF THE INVENTION

The present invention is conceived to accommodate high data rate, large volume digital data requirements. Prior art systems of the high data rate, large volume digital data type in the past have generally relied upon space diversity; that is, a multiplicity of parallel input/output data lines to simultaneously transmit large volumes of digital data to achieve a high data rate. The present invention, however, conceives the use of both frequency and time diversity rather than reliance upon space diversity in the form of a mere multiplicity of transmission lines in order to provide large volume digital data capabilities at a relatively high data rate.

Moreover, the present invention contemplates a data rate which is sufficiently high to accommodate complex computer and peripheral equipment combinations so that their operation will not be inhibited by delays in data exchange and the full potentials of such computation and data processing equipments may be wholly realized. For example, data rates of 8 to 12 MHz are contemplated, although the concept of the invention disclosed herein does not inherently require the restriction to that range of data rates and higher data rates are readily attainable within the teaching and spirit of the present invention.

Moreover, as contemplated by the present invention, a preferred embodiment of the system will enhance and promote switching capabilities to significantly improve the versatility and potentiality of large computers, data processing equipment or any large data exchange complex. Inherent in the concept of the present invention is the feature that the serial data rates or clock frequencies are developed or extracted from the carrier frequencies employed to denote the binary form of digital data.

The serial data rate or clock frequencies may be the same as the carrier frequencies but need not necessarily be within the concept of the present invention. However, the serial data rates or clock frequencies are extracted from the carrier frequencies and may, for example, be developed by dividing the carrier frequencies to any convenient and suitable serial data rate or clock frequency such as a sub-harmonic, for example. In many usages the carrier frequencies will be transmitted over a coaxial line. Similarly, the carrier frequencies may be transmitted by any convenient means such as conventional propagation where the transmission link is over too great a distance for the use of coaxial lines.

Regardless of what mode of transmission is used, the selected carrier frequencies will be such that the remote or receiver clock frequencies, i.e., the pulses used to convert serial data back to parallel data output, may readily be extracted from the carrier frequencies received at the remote or receiver station. Thus, in accordance with the concept of the present invention only one transmission link, such as a single coaxial line, for example, is required for multi-channel transmission and reception of data as well as the associated necessary synchronization and clocking functions.

Additionally, inherent in the concept of the present invention is the contemplation that the carrier frequencies developed at the transmitter for designating binary data information may be counted down or divided by a selectable factor to reduce bandwidth requirements on the transmission link which conveys such carrier frequency information to the remote or receiver station. At the remote or receiver station the received, counted down, carrier frequencies are multiplied by a factor which is related to the division factor employed before transmission and the multiplied carrier frequencies are then processed through appropriate frequency detection circuits to recover the information contained therein.

Further, in the contemplation of the present invention the concept of counting down or dividing carrier frequencies before they are transmitted, lends itself ideally to multi-channel operation where each channel may either use different initial carrier frequencies to be counted down by a like division factor, or may use the same initial carrier frequencies counted down by different division factors for each channel so that all channels may be simultaneously transmitted and readily separated by appropriate filtering and detection techniques at the receiver or remote station to recover the digital data contained herein.

It is a primary object of the present invention to provide a system capable of high volume data transmission.

An equally important object of the present invention is to provide such a high volume data transmission system which is capable of operation at an extremely high data rate.

Yet another most important object of the present invention is to provide such a high speed, large volume, data transmission system which eliminates the need for both the transmission and the independent generation of synchronization information for the purpose of developing clock signals and associated data rates at the transmission and receiving stations.

Another object of the present invention is to provide a high speed, large volume data transmission system which lends itself readily to multi-channel transmission and multiplexing techniques.

A further object of the present invention is to provide a high speed, high volume data transmission system for simultaneous multi-channel, non-return-to-zero digital data transmission and reception.

Yet another further object of the present invention is to provide such a high speed, large volume data transmission system which is amenable to the division or count down of transmitted carrier frequencies to minimize transmission bandwidth requirements.

Another object of the present invention is to reduce the number of output lines or comparable transmission means required in a data transmission system for thereby facilitating the switching of data to or among different computer or data processing equipments and their peripheral sources of data.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is a schematic block diagram illustrating a typical embodiment of the transmission portion of the data system of the present invention;

DESCRIPTION OF THE PREFERRED EMBODIMENT

Figure 2A:
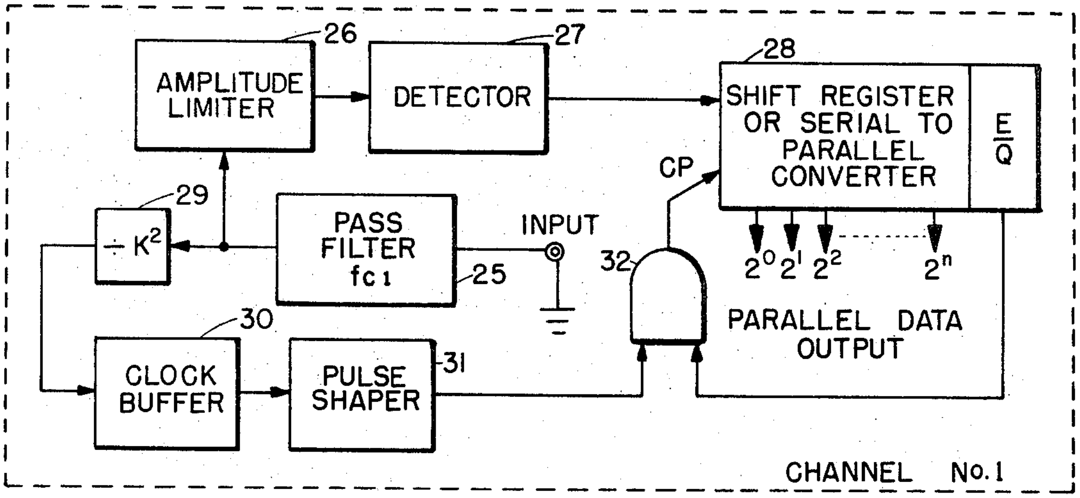
FIGS. 2*a*, 2*b*, and 2*c* are schematic block diagrams of typical embodiments of the receiver portion of the data system of the present invention.

FIG. 1 illustrates an embodiment of the present invention in which data is processed for transmission in one of the simpler forms of the new and inventive high speed, large volume data transmission system of the present invention. The schematic illustration of FIG. 1 assumes that the digital data is initially in parallel form. The parallel data may be introduced into the system through the gates 10, 11 and 12 which may typically represent successive powers of the base 2, as for example, $2^0$, $2^1$, etc., in a plurality of such gates as may be required to a gate representing $2^n$ for the *n*th bit. The input signal delivered at the point marked A is always "true," i.e., a binary code 1. The plurality of gates containing digital data in parallel form are connected to a parallel-to-serial-converter 13 which may take the form, for example, of a shift register.

Upon the actuation of a clock gate 14, the parallel-to-serial converter 13 delivers serial digital data outputs to a carrier frequency generator 15 which performs the function of generating first and second carrier frequencies representing the two binary states i.e., 1 and 0. The carrier frequency generator 15 may comprise a "DC to Sub-Microsecond Switchable Variable Frequency Oscillator" of the type disclosed in the previously referenced co-pending U.S. Pat. application. These frequencies may be designated $f_{C1}$, denoting the carrier frequencies of a first channel.

The carrier frequencies are then processed through a plurality of series-connected frequency dividers 16, 17, and 18. If it is assumed that in the illustration of FIG. 1, K = 2, then the initially generated carrier frequencies for the first channel, $f_{C1}$, are divided by eight by reason of being sequentially processed through the three frequency dividers 16, 17, and 18, each of which divides its input signal by two. Thus, the initially generated carrier signals are divided by eight and connected to a pulse shaping circuit 19.

After undergoing an appropriate pulse shaping operation, the divided carrier frequency signals are connected as one of two inputs to an AND gate 14 where they function as clock signals determinative of the data rate at which the serial data is shifted out of the parallel-to-serial converter 13. The AND gate 14, however, requires a second signal at its input terminal 20 to be enabled so that the clock pulses in the form of the divided carrier frequencies can be passed on to the parallel-to-serial conversion means, or shift register 13. The second signal input to terminal 20 is customarily derived from the same source as the parallel data input, such as associated data processing or computation equipment, and such signal usually designates each full complement of parallel data as received by parallel serial converter 13.

Upon reception of an appropriate control input signal impressed upon the input terminal 20, the AND gate 14 becomes enabled and clocking pulses are received into the parallel-to-serial converter or shift register 13 so that the data which has been temporarily stored in the parallel-to-serial converter or shift register 13 becomes shifted out in the form of a serial data output denoting two different binary states in accordance with the information it contains.

The serial data bits are connected as input signals to a carrier frequency generator 15 preferably of the type disclosed and claimed in the referenced co-pending patent application filed in the name of applicant, in which first and second carrier frequencies are generated, each being representative of a different binary state, so that the carrier frequencies $f_{C1}$ (for the first channel) are connected as the input to mixer 21 in the form of two different frequencies, the sequence of which represents binary data.

These carrier frequencies for the first channel, $f_{C1}$, may be transmitted directly over a coaxial output line for example, if the remote station which is to receive the information is not too distant, or in some cases may be propagated in a conventional manner to a remote receiving station.

In the configuration illustrated in FIG. 1 a plurality of channels are mixed in the mixer 21, appropriately amplified in a line driver 22, and thereafter transmitted over a common coaxial line. In FIG. 1 channel 2 is represented by the dash line enclosure and provides the means for transmitting a second channel of similarly processed digital data as represented in the carrier frequency $f_{C2}$. The equipment of channel 2 is identical in all essentials to that shown in channel 1 and accordingly is represented merely by the dash line enclosure, accepting parallel data input at the several gates represented.

Similarly, a plurality of such channels may be connected to the mixer 21 as indicated by the several dash line, partial connections carrying a plurality of inputs to the mixer 21. Thus, any desirable plurality of channels as schematically represented by channel M may be interconnected for transmission of a plurality of carrier frequencies over a single path, all additional channels containing circuitry essentially identical with that of channel 1, and symbolically represented by channel M and shown receiving parallel data input. Channel M produces carrier signals of frequencies $f_{CM}$ which differ from the carrier frequencies of the other channels and may be generated as initially different frequencies or divided down to different harmonics so that when the carrier frequencies of the various channels reach the mixer 21, there are different frequencies representing the binary digital information of different channels.

Figure 2B:
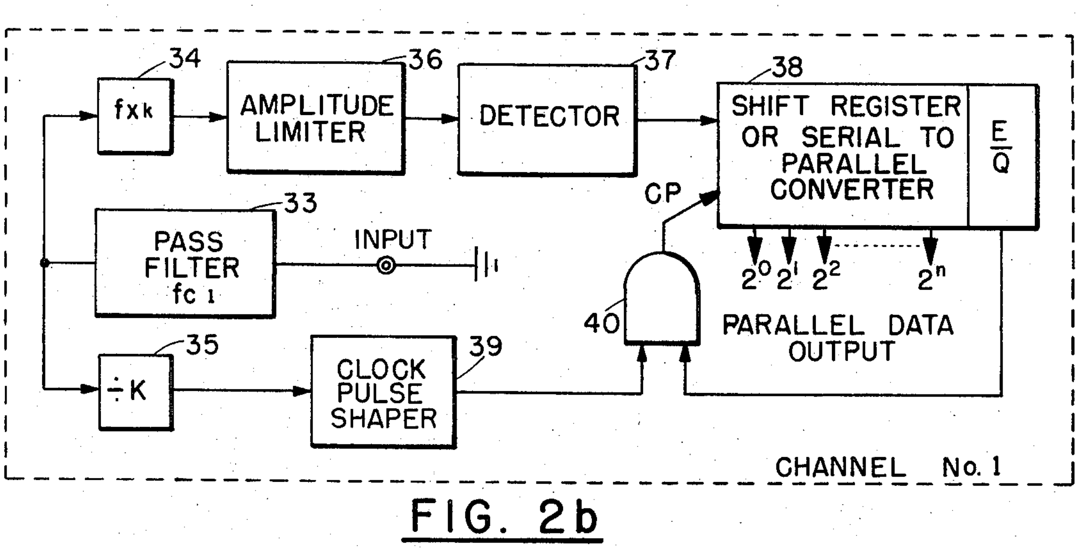
Figure 2C:
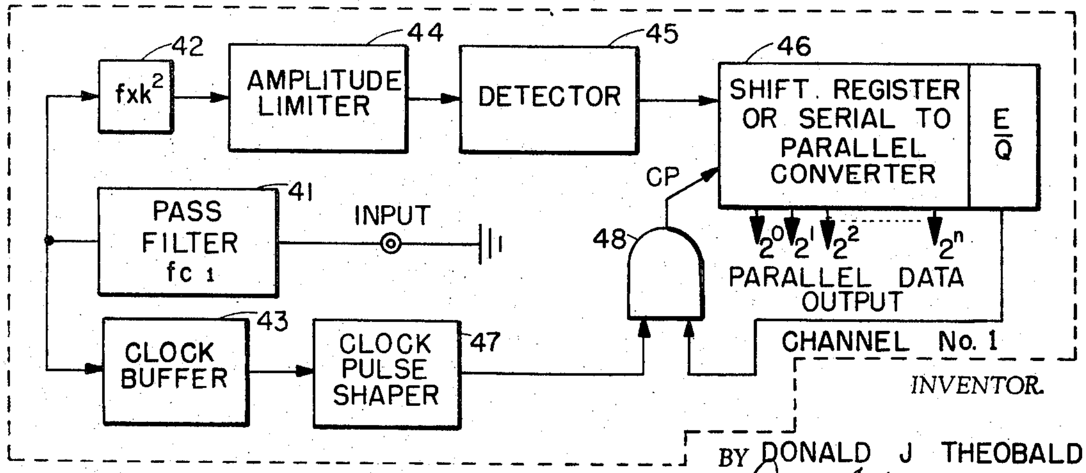

FIGS. 2*a*, 2*b*, and 2*c* illustrate typical receiver portions of the data transmission system of the present invention and, as shown in FIG. 2*a* pass filter 25 is arranged to receive the signals transmitted from the line driver 22 through a connection to a coaxial line, for example, or an appropriate reception means for propagated signals in accordance with the requirements of the system as determined from the remoteness of the receiver station, as well as other pertinent considerations.

The pass filter 25 passes only the $f_{C1}$ frequencies which are then connected to a limiter 26 which limits the received signals to a predetermined magnitude so that all the signals connected from the limiter 26 to the detector 27 are of the same amplitude, though varying in frequency in accordance with the binary state representing the transmitted data information. The detectr 27 is preferably of the type disclosed and claimed in the previously referenced U.S. Pat. No. 3,721,913 titled "DC to Sub-Microsecond Frequency Change Detector" and issued Mar. 20, 1973 in the name of applicant. The detector performs the function of high speed detection of frequency, producing an output which is either a binary 1 or a binary 0 in accordance with the information contained in the two frequency states.

This binary information, which is the output of the detector 27, is connected to a serial-to-parallel converter 28 which may take the form of a shift register. Successive bits of data in binary form are serially fed into the shift register 28 which operates in a manner to be more fully explained hereinafter.

The receiver input, which comprises two different frequencies transmitted at data rates which, it will be recalled, are essentially the two different frequencies divided by eight, are connected from the pass filter 25 where they are received to a frequency divider 29 in which they are divided by $K^2$, or four, thus producing frequencies which are twice the data rates originated in the transmission portion of the system.

These frequencies, which are twice the data rates, are developed in the receiver for reasons which will be understood more fully from the explanation of the operation of the receiver portion of the system which follows. The received carrier frequencies divided by four are connected to a clock buffer 30 and then to a clock pulse shaper 31 which produces as its output a short pulse corresponding to each negative-going portion of the received signals (or the alternative, each positive-going portion of the received signals) to produce an output of short duration of the type generally known in the art as a "strobe" pulse.

The "strobe" pulses are connected as one of the inputs to an AND gate 32. The second input to the AND gate 32 is provided by a connection from the serial-to-parallel register 28. It will be recalled that in FIG. 1 the parallel-to-serial converter 13, which may take form of a shift register, receives an input signal delivered to the shift register at the point marked A which is always "true," i.e., a binary code 1.

Upon actuation of the AND gate 14 in FIG. 1, the data in the parallel-to-serial converter 13 was shifted out with the "true," or binary code 1 bit, entered at point A of the register being the first to be shifted out and transmitted; consequently, it is the first data bit received by the receiver portion of the system and upon detection becomes the first data bit received as an input to the serial-to-parallel register 28.

The registers 13 and 28 in the transmission and receiver portions of the system, respectively, are capable of accommodating a like number of data bits; therefore when the full register 13 has been emptied of its data by sequential shifting operations under the actuation of the clock pulses received from the AND gate 14, they are subsequently received into the serial-to-parallel register 28 in the receiver portion of the system and the "true" or binary 1 received as an input to the parallel-to-serial converter or shift register 13 becomes the bit E of the serial-to-parallel register 28, indicating that the full capacity of data bits has been received into the register 28.

The true or binary 1 bit from E is connected as an input to the AND gate 32 which enables AND gate 32 and transfers an actuation pulse to the register causing the register 28 to stop its shift operation. Its stored data bits in parallel data form are available in the register until it is cleared to receive a subsequent series of data bits or data word. After being cleared the register 28 is in condition to receive the next succession of data bits which are sequentially stored until the full complement of such bits are received; then the AND gate 32 is once again disabled until the serially stored data bits are utilized as, for example, in a parallel format, and the register 28 is cleared and available to receive further subsequent, additional serial data bits.

Figure 3:
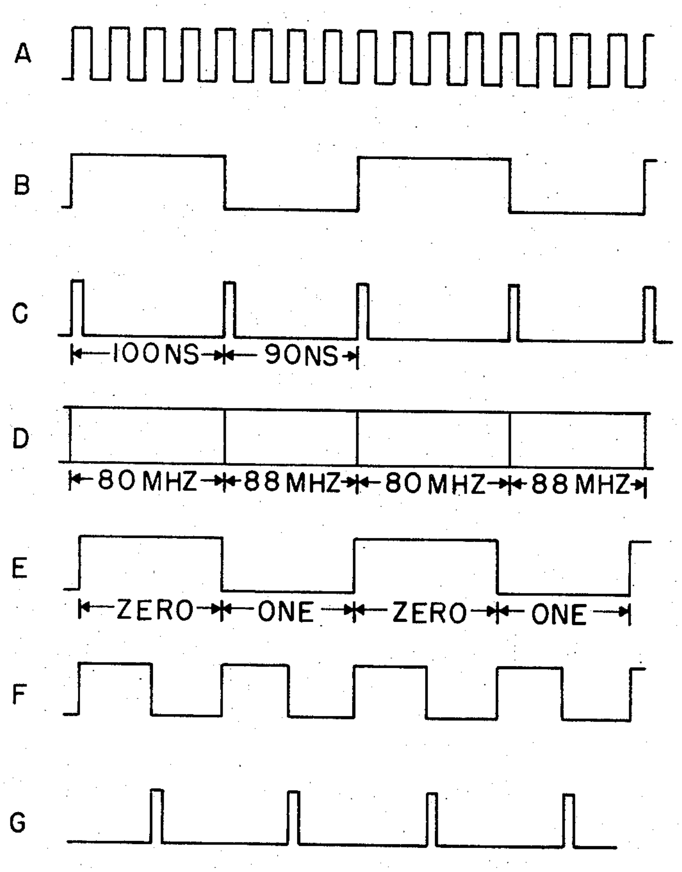
FIG. 3 is an illustration of waveforms developed in the operation of the present invention.

The reason for the strobe type clock pulses becomes apparent by reference to FIG. 3 which illustrates a number of waveforms developed in the operation of the system of the present invention.

Assuming for purposes of explanation that waveform A represents the two carrier frequencies generated to denote the two different binary states i.e., binary 1 or a binary 0, it may be readily appreciated that if the binary 1's are represented by a frequency of 80 MHz and the binary 0's are represented by a frequency of 88 MHz, the difference in cyclic periods between these two frequencies is measurable in nanoseconds. Accordingly, on a scale such as that of the illustrative drawings it is difficult to visually discern the difference in frequency.

If the initially generated carrier frequencies of 80 MHz and 88 MHz are divided by eight, as they are in the illustration of the embodiment of FIG. 1 to provide clock pulses determining data rate, the frequency as shown by waveform B is generated and upon undergoing pulse shaping in the clock pulse shaping circuit 19 of FIG. 1, clock pulses are produced generally of the character illustrated in waveform C. Such clock pulses determine the data rate of transmission of the digital information so that the receiver has an input consisting of alternate periods of 80 MHz and 88 MHz signals as shown diagramatically in waveform D.

Ideally, the high speed frequency change detector 27 of FIG. 2*a* in an embodiment of the concept disclosed and claimed in the referenced U.S. Pat. No. 3,721,913, will produce an output of the type illustrated by waveform E in FIG. 3. However, some degree of distortion of waveforms may be inevitable and therefore it is highly desirable in a preferred embodiment of the present invention that the detected data, in the form of two binary states, i.e., 1's and 0's as represented by two different frequencies, be sampled at approximately the mid-point of each data bit in order to insure the highest probability of detecting the correct data information in the event of distortion at or near the leading edges and trailing edges of the ideally represented waveform E of FIG. 3.

Accordingly, as shown in FIG. 2*a*, the input signal (which has a data rate of the basic carrier frequencies divided by eight by reason of the described operation of the transmitter portion of the system shown in FIG. 1) is divided by $K^2$, or four, in frequency divider 29 to produce a frequency output which is twice that of the data rate of the received input information. Such frequency, as is produced by frequency divider 29 of FIG. 2*a*, is represented visually by waveform F of FIG. 3.

The clock pulse shaping circuit 31, after receiving that signal from a clock buffer 30, produces an output responsive only to the negative-going portions of its input signal to generate an output of short sampling pulses as represented by waveform G of FIG. 3 which, it is readily apparent, provides short sampling pulses occurring at or near the mid-point of each data bit as represented by waveform E.

Thus, in a preferred embodiment of the present invention it is highly desirable that the clock pulses employed for sampling the output of the detector in the receiver portion of the system be generated to sample the mid-point of each data bit; one method of accomplishing that end is to generate a frequency of twice that of the transmitted data rate, deriving short sampling pulses for gating purposes at each negative-going portion of those frequencies which are twice the data rate of the transmitted data information.

The concept of the present invention contemplates that, in order to minimize bandwidth requirements, the transmitted frequencies may be divided down. Accordingly, when desirable or necessary a divided frequency for transmission to the remote or receiver station may be taken from the output of frequency divider 16 of FIG. 1. Therefore, the transmitted carrier frequencies will be the initially generated carrier frequencies divided by two.

Similarly, when desirable, a divided frequency for transmission purposes may be taken from the output of frequency divider 17 or frequency divider 18 of FIG. 1 which provide carrier frequencies divided by four and eight, respectively. It should be borne in mind, however, that regardless of whether or not the transmitted frequencies are in a divided form, the data rate will remain the same relative to the carrier frequencies, as for example, in the embodiment of FIG. 1 the data rate is one-eighth of the carrier frequencies regardless of which point among the series connected frequency dividers the signal for transmission may be derived.

Thus, for a clear understanding of the operation of the present invention, FIGS. 2*b* and 2*c* illustrate the receiver portion of a system embodying the present invention, wherein carrier frequencies divided by different factors are selected in the transmission portion of the system and received at the remote station. The fact that the data rate is one-eighth of the carrier frequencies is determined by the particular embodiment illustrated in FIG. 1. This is so because when the transmitted signals are divided by a selected factor both the data rate and the carrier frequencies are divided by the same factor, so that the data rate relative to the carrier frequency maintains an unchanged relationship.

FIG. 2*b* illustrates the receiver portion of a system adapted to operate in the described preferred manner upon the reception of signals which have been divided by two and the transmitted signals having been taken, for example, from the output of the divider 16 of FIG. 1. Such signals are received and filtered by a pass filter 33 to eliminate all but the wanted frequencies which are then connected to both a frequency multiplier 34 and a frequency divider 35. Since the transmitted carrier frequencies have been divided by a factor of two, the frequency multiplier 34 is employed to multiply the received signals by K, or a factor of two, for returning the received carrier signals to their original frequencies. The multiplied signals are connected to a limiter 36 and, in turn, to a detector 37 which provides a binary input to a serial-to-parallel converter means 38 which may take the form of a shift register, for example. All of these interconnected components operate in a manner analagous to that described in connection with the explanation of the operation of the embodiment of FIG. 2*a*.

The received signal connected from the pass filter 33 to a frequency divider 35 is divided by a factor of K, or two, thereby producing frequencies which are divided by four relative to the initially generated carrier frequencies, since the input received at the input buffer had already been divided by two before transmission. The output frequencies of the frequency divider 35 therefore are of twice the frequency of the data rate since they comprise frequencies divided by a factor of four relative to the originally developed carrier frequencies, whereas the data rate is determined by the same carrier frequencies divided by a factor of eight as is shown, illustrated, and explained in connection with the embodiment of FIG. 1.

The output frequencies of the frequency divider 35 undergo appropriate pulse shaping in pulse shaper 39 which is operative to produce short sampling pulses at each negative-going portion of its received input wave. Such short sampling pulses are connected to an AND gate 40 which also receives an enabling signal from the register 38 operative to enable the register to store data bit information in a serial form. When the register 38 fills its stored capacity, it is disabled until it is cleared, making it available for the next series of data bits, or data word.

FIG. 2*c* illustrates a third version of the present invention wherein the received signals have been divided by a factor of four in the transmission portion of the system. Such signals may be conveniently derived from the output of frequency divider 17, for example, in the illustration of FIG. 1. Therefore, the transmitted signals have been divided by a factor of four, but as has been previously mentioned, the transmitted and received data rates relative to the carrier frequencies remains as a division factor of eight. Accordingly, the transmitted signals, which are received at the input buffer 41, are connected as inputs to both a frequency multiplier 42 and a clock buffer 43. The frequency multiplier 42 operates to multiply the received signals by $K^2$, or a factor of four; since the transmitted signals have been divided by a factor of four at the transmitter, the frequency multiplication operation of the frequency multiplier 42 returns the signals to their originally developed carrier frequencies.

From the frequency multiplier 42, the output signals are connected to a limiter 44 and then to a detector 45 which has its output impressed upon a serial-to-parallel conversion means or shift register 46. All of the previously mentioned interconnected components operate in a manner analogous to the operation described in connection with the embodiments of FIGS. 2*a* and 2*b*. Because the transmitted and the received signals were originally divided by a factor of four in the transmitter portion of the system, they have a two-to-one frequency relationship relative to the data rates of the signals developed at the output of the frequency multiplier 42 which multiplied the transmitted and received signals by four, returning those signals to their original carrier frequencies and data rates. It will be recalled that the data rates at the transmission portion of the system were determined to be the carrier frequencies divided by a factor of eight by reason of successive divisions by two through the frequency dividers 16, 17, and 18. The transmitted signals were subsequently further divided by a factor of four. Thus, the clock buffer 43 receives signals which are twice the data rates of those at the output of frequency multiplier 42 and bear the desired frequency ratio relationship for purposes of generating sampling pulses which fall at or near the mid-point of each data bit.

The output of the clock buffer 43 is connected to the input of the clock pulse shaping circuit 47 which develops a short sampling pulse at each negative-going excursion of its received inut; the output of pulse shaping circuit 47 therefore provides the desired sampling pulses, disposed in time relationship at approximately the mid-point of each data bit, the optimum point within each data bit cyclic period. The sampling pulses are impressed upon an AND gate 48 as one of its two inputs.

The second input to the AND gate 48 is received periodically from the serial-to-parallel conversion means or shift register 46 which provides a disabling pulse upon its reception of a predetermined number of serial data bits filling its data bit capacity. Upon subsequently being cleared, the register 46 is re-enabled to receive and store the next sequence of serial data bits.

Accordingly, it should be readily apparent that the concept of the present invention, in addition to developing required clock pulses and sampling pulses from transmitted carrier frequencies which represent digital data information, provides for dividing down the signal developed at the transmission portion of the system before transmission and reception by the remote or receiver portion of the system, by any desirable factor, thereby reducing that bandwidth requirement for multi-channel transmission on a single line or transmission means and accommodating readily to multiplexing techniques. The extremely high data rates and other desirable attributes of the system conceived by the present invention render it readily adaptable to such multi-transmission use.

The foregoing explanations all relative to modes of operation of different embodiments of the present invention, each of which included channel 1 of FIG. 1. Multi-channel operation, however, may involve simultaneous use of channels 2 through M as schematically represented in FIG. 1.

Figure 4A:
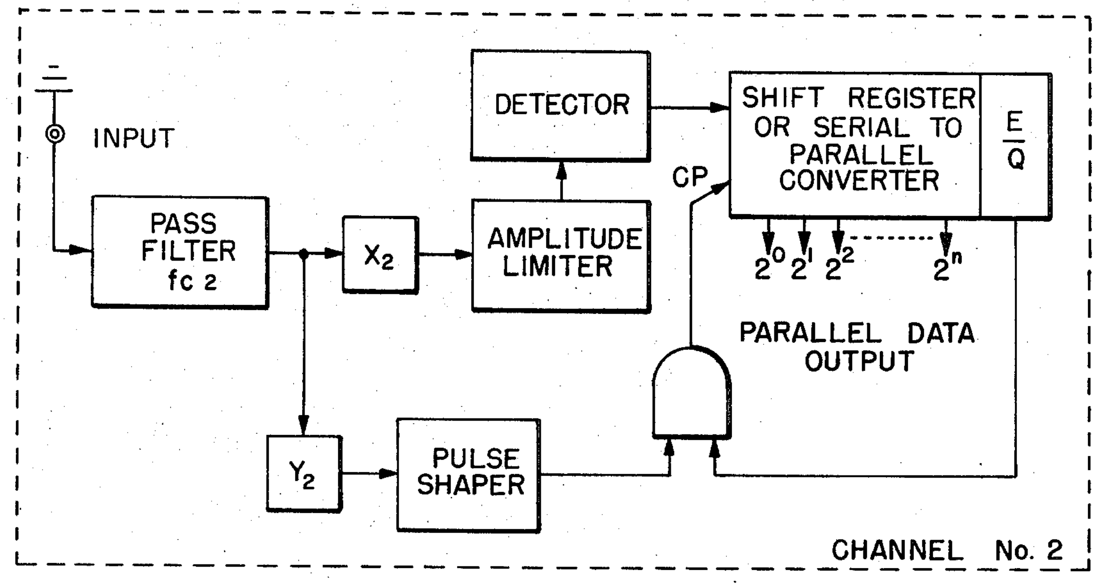
FIGS. 4*a* and 4*b* illustrate variant embodiments of the concept of the present invention as pertain to the receiving portion of the data transmission system.
Figure 4B:
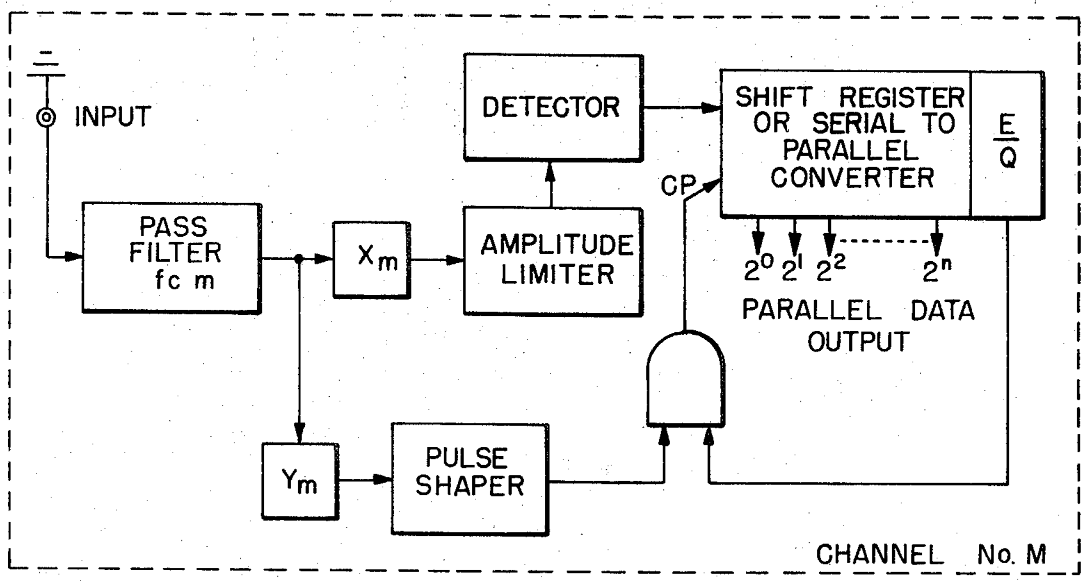

FIGS. 4*a* and 4*b* illustrate receiver embodiments where the pass filters are adapted to filter out all but the frequencies $f_{C2}$ and $f_{CM}$, respectively. In FIG. 4*a* a frequency multiplier designated $X_2$ operates to multiply the filtered signals for regenerating either the original channel 2 carrier frequencies or convenient predetermined frequencies; frequency multiplier or divider $Y_2$, multiplies or divides the filtered signals to provide a proper date rate ratio as previously explained in connection with the description of the operation of the receivers of FIGS. 2*a*, 2*b*, and 2*c*.

FIG. 4*b*, which represents the receiver portion of the system associated with channel M, includes a pass filter which filters out all but the frequencies $f_{CM}$. A frequency multiplier $X_M$ operates to regenerate the original channel M carrier frequencies or other preselected frequencies convenient and suitable for detection. A frequency multiplier-divider $Y_M$ also receives the filtered signals and either multiplies or divides frequency as necessary to provide the correct carrier frequencies-to-data rates ratio as taught by the concept of the present invention.

Figure 5:
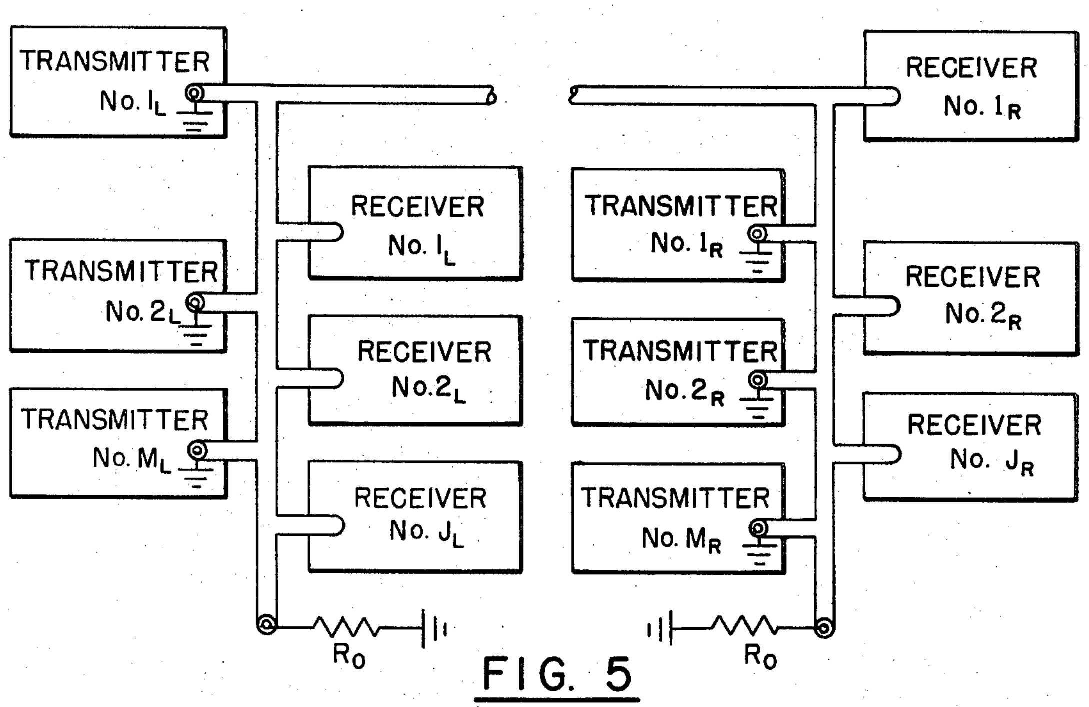
FIG. 5 illustrates one type of multi-channel embodiment of the present invention.

FIG. 5 is a schematic block diagram illustration typical of one type of multi-channel use of the present invention for purposes of reception and transmission between a number of transmitting points and a number of reception points, all over a single transmission means such as a long coaxial line or an appropriate propagation system. In FIG. 5 the plurality of transmitters illustrated on the left side of the figure may be all connected to a common coaxial line without the requirement of a separate mixer circuit. Similarly, the plurality of transmitters on the right hand side of the figure may be interconnected without the requirement of a separate mixing circuit. The transmitters $1_L$, $2_L$, through $M_L$ generate and transmit data over a common transmission path, which transmissions are received by receivers $1_R$, $2_R$, through $M_R$. Conversely, transmitters $1_R$, $2_R$, and $J_R$ carry and transmit data over a common path which are received by receivers $1_L$, $2_L$, and $J_L$. This type of multi-channel operation is made possible within the concept of the present invention because of the extremely high data rate capabilities of the present invention, together with the fact that the need for transmitting separate synchronization or clock information is obviated, inasmuch as the present invention derives its data rate clock information from the transmitted carrier frequencies which also contain the data information; the fact that the transmitted carrier frequencies may themselves be divided down by any desirable factor provides desirable channel separation as well as minimizing the requirements for bandwidth.

Figure 6:
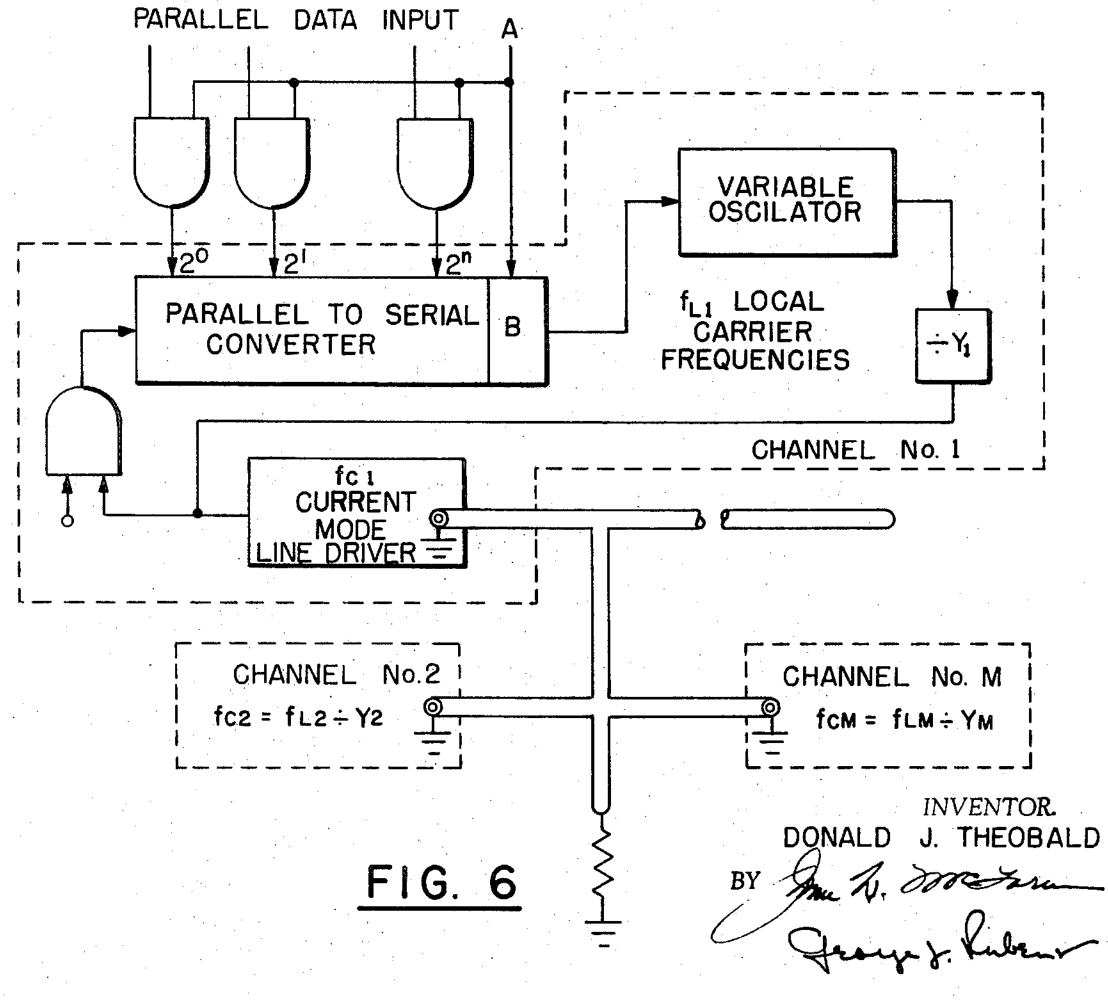
FIG. 6 illustrates an embodiment of the transmitter portion of the present invention adaptable to time division and/or frequency division for multi-channel transmission of data.

FIG. 6 is a schematic diagram of a variant multi-channel version of the transmitter portion of a system embodying the concept of the present invention and which is illustrative of the flexibility afforded for different modes of operation within the teachings of the present invention.

The components and circuitry of each of the channels, channel 1, channel 2, and channel M shown in FIG. 6 are essentially the same as illustrated and described for channel 1 of FIG. 1, and operate substantially in the manner explained in connection with FIG. 1.

In channel 1 of FIG. 6, local carrier frequencies $f_{L1}$, are generated which are representative of digital data information. The local carrier frequencies, $f_{L1}$, are divided by a factor $Y_1$ to produce the carrier frequencies, $f_{C1}$, for transmission. In a similar manner, channels 2 through channel M generate local frequencies, $f_{L2}$ through $f_{LM}$, respectively, which are divided by factors $Y_2$ through $Y_M$, respectively, to produce carrier frequencies $f_{C2}$ through $f_{CM}$ for transmission over a common path with the carrier frequencies.

As a result of the selection of local frequencies and $f_{C1}$ the selection of dividing factors, the transmitted frequencies may be the same for several channels or different for each channel. Accordingly, if the transmissions have common frequencies, the different channels can be arranged to time share the transmission path. On the other hand if the transmitted frequencies are all different, they may share the transmission path for simultaneous transmission. Of course, care should be taken that confusing harmonic, or sum and difference frequencies are not developed in simultaneous transmissions. Appropriate selection of local frequencies and division factors will ensure that interferring or confusing resultant beat frequencies are not generated in simultaneous, multiplex transmissions.

Those knowledgeable in the pertinent arts will readily appreciate that any desirable combination of the time division and the frequency division techniques described hereinbefore may be adapted to particular requirements of different usages of the concepts, and teachings of the present invention, as may be necessary or preferable.

Those skilled and knowledgeable in the related arts will fully appreciate that the unique characteristics of the system of the present invention are desirably adaptable to simultaneous multi-channel, non-return-to-zero digital data transmission and reception. Additionally, for any given data rate and type of coaxial line, the line losses experienced in embodiments of the present invention will be less than those of prior art systems, i.e., the losses will be minimized by reason of the counting down of the local carrier frequenciee before being transmitted. Moreover, only two frequencies are required for the transmission of "zeros" and "ones" representing the binary digital data.

Another advantage which is inherent in the concept of the present invention is that the reduction in the number of output lines and the method of channel selection reduces the difficulty and problems of switching data to or among different equipments, such as computers involved in complex data links together with peripheral equipments.

Obviously many modifications and variations of the present invention are possible in the light of the above teachings. It is therefore to be understood that within the scope of the appended claims the invention may be practiced otherwise than as specifically described.

What is claimed is:

1. A high volume, binary data transmission system comprising:
- a carrier frequency generator responsive to serial binary input data signals for sequentially generating signals of first and second carrier frequencies representative of binary data bits commensurate with the information contained in said input data signals;
- means dividing both said carrier frequencies by a predetermined integral factor for developing first and second subharmonic clock frequencies;
- means for controlling the sequential generation of said first and second carrier frequencies in accordance with the instantaneous bit rates of said first and second subharmonic clock frequencies respectively;
- means for transmitting said first and second carrier frequencies to a receiver at said instantaneous bit rates;
- frequency responsive means connected to said receiver for generating sequential first and second output signals commensurate with the received first and second carrier frequencies, respectively, and representative of binary data bits;
- storage means for receiving said sequential first and second output signals and storing said output signals in the form of sequential binary data bits;

means dividing both said received carrier frequencies by said predetermined integral factor for developing first and second receiver clock frequencies therefrom identical with said first and second subharmonic clock frequencies respectively; and means impressing said receiver clock frequencies upon said storage means for sequentially actuating said storage means to accept said sequential output signals for storage.

2. A high volume binary data transmission system as claimed in claim 1 and including parallel-to-serial data conversion means connected to receive parallel binary input data signals for developing said serial binary input data signals.

3. A high volume binary data transmission system as claimed in claim 4 wherein said conversion means develops a cyclic signal, which is transmitted for designating a predetermined number of binary data bits.

4. A high volume binary data transmission system as claimed in claim 3 wherein the transmitted cyclic signal is connected at said receiver to disable the connection of said receiver clock frequencies to said storage means for de-actuating said storage means, preventing the storage of more than said predetermined number of binary data bits.

5. A high volume binary data serial transmission system as claimed in claim 1 wherein said storage means is operative to convert said sequential binary data bits to parallel output signals cyclically after the reception of each said transmitted cyclic signal.

6. A high volume binary data transmission system as claimed in claim 1 and including means for developing a strobe signal for sampling said frequency responsive means at substantially the mid-point of each received data bit.

7. A high volume binary data transmission system as claimed in claim 6 wherein said means for developing a strobe signal includes means for generating a synchronous signal at a frequency twice the bit rate and gating said frequency responsive means every alternate half cycle at substantially the mid-point of each received data bit.

* * * * *